United States Patent

Tanimoto et al.

[11] Patent Number: 4,549,126
[45] Date of Patent: Oct. 22, 1985

[54] PULSE MOTOR-DRIVING CIRCUIT

[75] Inventors: Yasufumi Tanimoto; Masahiko Ogura, both of Fujisawa, Japan

[73] Assignee: Tokyo Shibaura Denki Kabushiki Kaisha, Kawasaki, Japan

[21] Appl. No.: 580,138

[22] Filed: Feb. 14, 1984

[30] Foreign Application Priority Data

Feb. 23, 1983 [JP] Japan .................................. 58-28697

[51] Int. Cl.⁴ ........................ H02P 8/00; G05B 19/40
[52] U.S. Cl. .................................... 318/696; 318/138;
318/254; 318/439
[58] Field of Search ................... 318/138, 254 A, 254, 318/439, 696, 685

[56] References Cited

U.S. PATENT DOCUMENTS 4,249,116 2/1981 Hieda .............................. 318/439 X
4,278,926 7/1981 Bartlett ........................... 318/138 X
4,286,198 8/1981 de Valroger ....................... 318/138
4,434,392 2/1984 Brasseur .......................... 318/254 X

FOREIGN PATENT DOCUMENTS 3304253 8/1983 Fed. Rep. of Germany ...... 318/696
52-23611 2/1977 Japan ................................ 318/138
58-66600 4/1983 Japan ................................ 318/254

Primary Examiner—William M. Shoop, Jr.
Assistant Examiner—Bentsu Ro
Attorney, Agent, or Firm—Cushman, Darby & Cushman

[57] ABSTRACT

A pulse motor-driving circuit is disclosed, which circuit includes first and second exciting coils inductively coupled to each other, and first and second switching transistors for alternately exciting the exciting coils, through a D.C. power source. A Zener diode is connected to each of the switching transistors, for suppressing a transient voltage to be impressed on the switching transistors, when the excitations of the exciting coils are changed.

1 Claim, 5 Drawing Figures

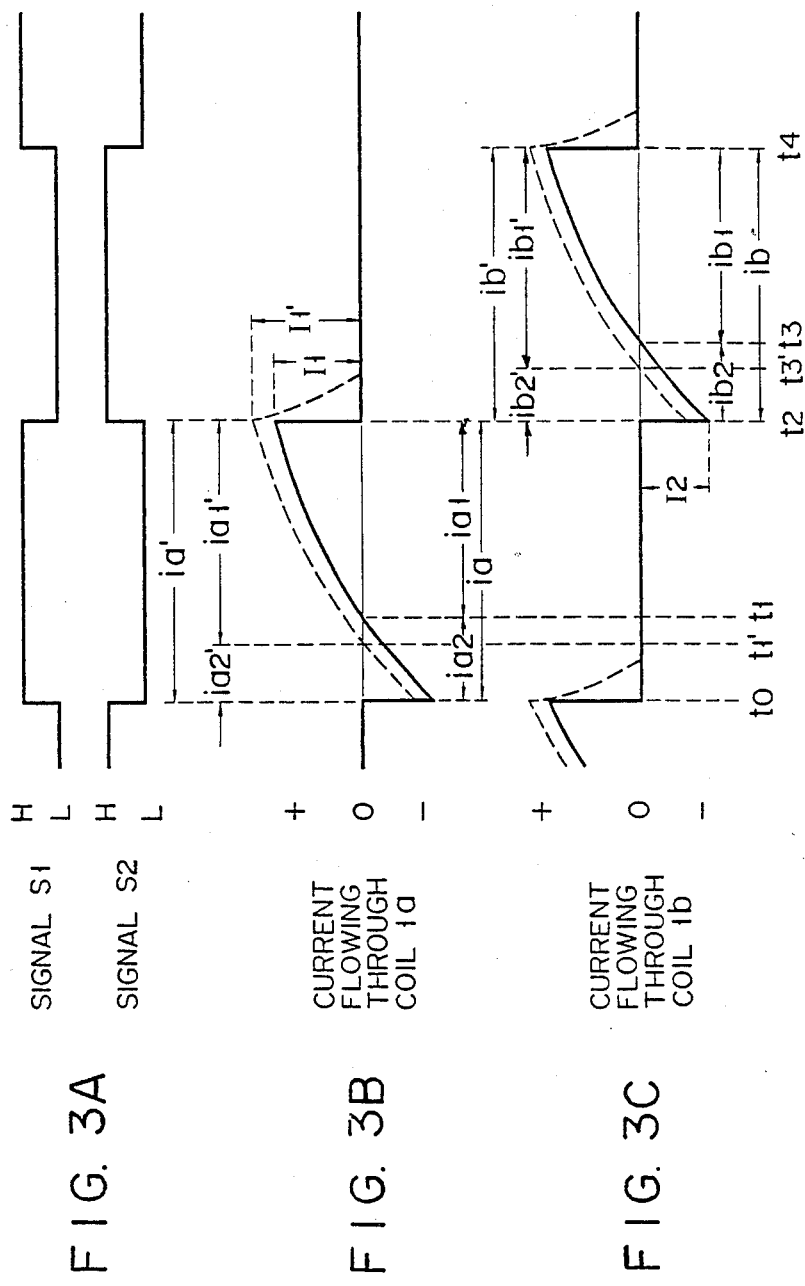

PULSE MOTOR-DRIVING CIRCUIT

BACKGROUND OF THE INVENTION

This invention relates to a pulse motor-driving circuit.

A pulse motor comprises a plurality of exciting coils wound about the stator. The rotor is rotated when the coils are excited by input pulse signals. The rotor is rotated by a predetermined angle, each time one input pulse is received. Therefore, the pulse motor is also referred to as a stepping motor.

The pulse motor which lacks a brush sustains a long effective life. Further, the number of input pulses received always bears a prescribed relationship to the rotational angle of the rotor, thereby saving the rotational angle from cumulation errors. Thus, since the member driven by the pulse motor may be situated without providing a feedback mechanism, the pulse motor may be so applied as to drive, e.g., an optical system, a photosensitive drum or a feed roller of a copy sheet, of a copying apparatus.

SUMMARY OF THE INVENTION

A pulse motor-driving circuit is shown in FIG. 1. A first exciting coil $1a$ and second exciting coil $1b$ constitute paired coils. These coils are wound about the stator of the pulse motor, in such a manner that as high a coupling factor as possible is assured. Generally, several groups of paired coils are wound about the stator. The first end of the first coil $1a$ is connected to the second end of the second coil $1b$ at a node 2. A D.C. power source 4 is connected, with the indicated polarity, between the node 2 and a reference potential line 3. The collector of a first switching transistor 5 is connected to the second end of the first coil $1a$, and the emitter of the transistor 5 is connected to the reference potential line 3. The collector of a second switching transistor 6 is connected to the first end of the second coil $1b$, and the emitter of the second switching transistor 6 is connected to the reference potential line 3. The cathode of a first commutation diode 7 is connected to the second end of the first coil $1a$, and the anode of the diode 7 is connected to the reference potential line 3. The cathode of a second cummutation diode 8 is connected to the first end of the second coil $1b$, and the anode of the diode 8 is connected to the reference potential line 3. A base resistor 9 is connected between the emitter of the first transistor 5 and the base electrode thereof. A base resistor 10 is connected between the emitter of the second transistor 6 and the base electrode thereof. An input signal S1 to control the operation of the fist transistor 5 is supplied to the base electrode of the transistor 5, through an input terminal 11 and a resistor 13. An input signal S2 to control the operation of the second transistor 6 is supplied to the base electrode of the transistor 6, through an input terminal 12 and a resistor 14.

It is here assumed that, as illustrated in FIG. 3A, the level of input signal S1 changes from "L" to "H" at time $t_0$, from "H" to "L" at time $t_2$, and from "L" to "H" at time $t_4$, and, that the level of input signal S2 changes from "H" to "L" at time $t_0$, from "L" to "H" at time $t_2$, and from "H" to "L" at time $t_4$. FIG. 3B shows the waveform of current flowing through the first coil $1a$. FIG. 3C indicates the waveform of current conducted through the second coil $1b$. The solid lines correspond to FIG. 1, and the dotted lines correspond to the later described FIG. 2.

A description may now be made of the waveforms indicated by the solid lines. The first and second transistors 5, 6 are rendered conductive when the input signal has a high level, and are rendered nonconductive when the input signal has a low level. In this case, a current flowing through the first coil $1a$ during the period from $t_0$ to $t_2$ has a magnitude equal to the sum of the magnitude of a current $i_{a1}$ passing in direction X during the period from $t_1$ to $t_2$, and that of a current $i_{a2}$ running in direction Y during the period from $t_0$ to $t_1$. Current $i_{a2}$ represents the current which is induced into coil $1a$ as a result of the cut off of an exciting current $i_{b1}$ conducted through coil $1b$ prior to time $t_0$. Current $i_{a2}$ is rapidly attenuated while it runs through the closed circuit defined by the coil $1a$, power source 4 and diode 7 and falls to the zero level at time $t_1$. The current $i_{a1}$ passing through coil $1a$ during the period from $t_1$ to $t_2$ progressively increases in magnitude, reaches a maximum magnitude at time $t_2$, and then falls to the zero level. When the first coil is excited by this current $i_{a1}$, the rotor is rotated by one step.

During the period from $t_2$ to $t_4$, a circuit defined by the power source 4, second coil $1b$ and transistor 6 is closed; and a circuit defined by the power source 4, first coil $1a$ and transistor 5 is opened. In this case, the current $i_b$ running through the second coil $1b$ has a magnitude equal to the sum of the magnitude of a current $i_{b1}$ flowing in direction Y, and that of a current $i_{b2}$ conducted in direction X. Current $i_{b2}$ is the current (having a maximum level of $I_2$) inducted into the second coil $i_b$, as the result of the sudden cut off of a current (having a maximum level $I_1$) conducted through the first coil $1a$ in direction X. Current $i_{b2}$ passes through a closed circuit defined by a diode 8, a second coil $1b$ and a power source 4; is suddenly attenuated by being absorbed by the power source 4; and falls to the zero level at time $t_3$. Current $ib_1$ begins to progressively increase in level from time $t_3$, reaches a maximum level $I_1$ at time $t_4$, and then drops to the zero level. When the second coil $1b$ is excited by the current $i_{b1}$, the rotor is further rotated by one step.

The coupling factor by which the first and second coils $1a$, , $1b$ are coupled together is theoretically 1, and currents $I_1$ and $I_2$ theoretically have the same level. However, it is impossible to set the coupling factor between the first and second coils $1a$, $1b$ at 1. The reason for this is that the coils $1a$, $1b$ have their own leakage inductances. The presence of the leakage inductances obstructs the complete transfer of the current $I_1$ flowing through, e.g., the first coil $1a$ to the second coil $1b$. In this case, the equation $I_1 = I_2$ cannot be satisfied. When, for example, the transistor 5 is cut off, a counter electromotive force is generated in the first coil $1a$, as the result of the aforementioned leakage inductance. The sum of the voltage due to the counter electromotive force and that of the power source 4 is impressed between the collector and emitter of the transistor 5. Therefore, it is necessary to protect the transistor 5 from damage. The same drawback as described above accompanies the transistor 6, as well.

The primary object of this invention is to provide a pulse motor-driving circuit which is provided with first and second exciting coils wound about the stator of a pulse motor and inductively coupled together, and semiconductor switching elements for selectively connecting a power source to one of the first and second exciting coils; which pulse motor-driving circuit further comprises suppressing means for suppressing a transient high voltage to be impressed on the semiconductor switching elements.

A pulse motor-dirving circuit according to one aspect of this invention comprises first and second exciting coils wound about the stator of a pulse motor and connected in series at a node between a first end of the first exciting coil and a second end of the second exciting coil, so as to be inductively coupled to each other, a reference potential line, a D.C. power source connected between the node and the reference potential line, a first switch connected between a second end of the first exciting coil and the reference potential line, which switch is controlled by a first signal for selectively exciting the first exciting coil, a second switch connected between a first end of the second exciting coil and the reference potential line, which switch is controlled by a second signal for selectively exciting the second exciting coil, commutation means which inductively transfers a first exciting current of the first exciting coil to the D.C. power source, through the second exciting coil, when the first switch is rendered nonconductive, and which also transfers a second exciting current of the second exciting coil to the D.C. power source, through the first exciting coil, when the second switch is rendered nonconductive, and means for suppressing a transient voltage to be impressed on the first and second switches, the transient voltage being produced when a commutation by the commutation means is carried out.

BRIEF DESCRIPTION OF THE DRAWINGS

FIGS. 3A to 3C indicate waveforms, by comparing the operation of the pulse motor-driving circuit of FIG. 1 to that of the pulse motor-driving circuit of FIG. 2, i.e., to that of the present invention.

DETAILED DESCRIPTION OF THE PREFERRED EMBODIMENT

Figure 1:
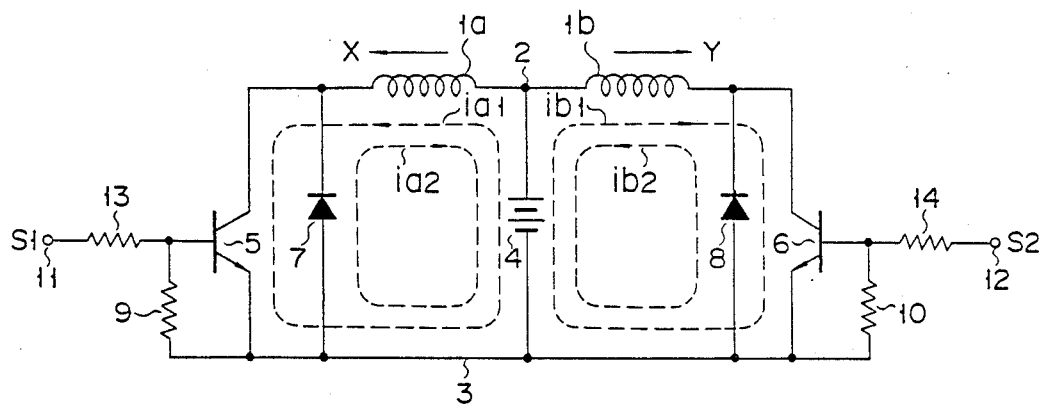
FIG. 1 diagramatically shows the circuit of a pulse motor-driving circuit.
Figure 2:
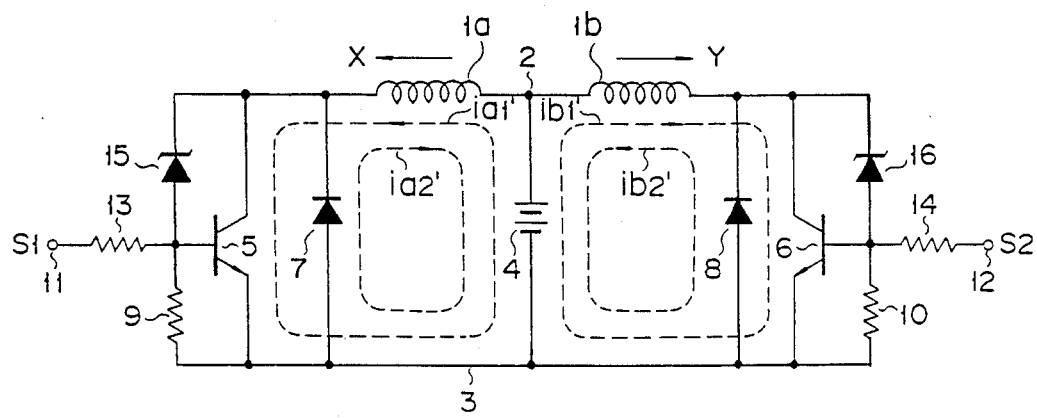
FIG. 2 diagramatically sets forth the circuit of a pulse motor-driving circuit embodying this invention.

The parts of FIG. 2 which are the same as those of FIG. 1 are denoted by the same numerals, a description thereof being omitted here. Referring to FIG. 2, the cathode and anode of a first Zener diode 15 are respectively connected to the collector and base electrode of an NPN transistor 5 acting as a first switch. The cathode and anode of a second Zener diode 16 are respectively connected to the collector and base electrode of an NPN transistor 6 acting as a second switch.

Referring to FIG. 3B, it may assumed that an exciting current flows through the second coil 1b, before time $t_0$, in direction Y. When, in this case, signal S1 has a high level and signal S2 has a low level at time $t_0$, transistor 5 is rendered conductive, and transistor 6 is rendered nonconductive. As a result, the current of the second coil 1b is cut off (FIG. 3C), and current $i_a'$ runs through the first coil 1a. This current $i_a'$ has a magnitude equal to the sum of the magnitude of current $i_{a1}'$ and that of current $i_{a2}'$ (FIG. 3B). Current $i_{a2}'$ is conducted in direction Y during the period from $t_0$ to $t_1'$. This current $i_{a2}'$ is a current induced into the first coil 1a, as a result of the cut off of the current of the second coil 1b. An exciting current $i_{a1}'$ flows through the first coil 1a during the period from $t_1'$ to $t_2$. The maximum level of this exciting current $i_{a1}'$ is expressed as $I_1'$ (FIG.

3B). At time $t_2$, signal S1 has its level changed to "L", and signal S2 has its level changed to "H" (FIG. 3A). As a result, transistor 5 is rendered nonconductive, and transistor 6 is rendered conductive. At this time, current $i_b'$ runs through the second coil 1b. This current $i_b'$ has a magnitude equal to the sum of the magnitude of current $i_{b1}'$ and that of current $i_{b2}'$. This current $i_{b2}'$ is a current induced into the second coil 1b or transferred from the first coil 1a to the second coil 1b as a result of the cut off of the current of the first coil 1a. Current $i_{b2}'$ passes through the second coil 1b in direction X, through the power source 4 and diode 8, and is finally absorbed by the power source 4. At time $t_3'$, the magnitude of the current $i_{b2}'$ decreases to the zero level. Current $i_{b1}'$ is used to excite the second coil 1b.

When the current $I_1'$ conducted through the first coil 1a is cut off, a counter electromotive force acting in direction X is generated in the first coil 1a, as a result of leakage inductance. Consequently, the voltage impressed between the collector and emitter of transistor 5 rises, rendering it conductive. Thus, the counter electromotive force generated in the first coil 1a, as a result of its leakage inductance, is consumed in the transistor 5, during the period from $t_2$ to $t_3'$, and is rapidly attenuated. In this case, the level of the voltage impressed between the collector and emitter of the transistor 5 is limited by the breakdown voltage of the Zener diode 15. A counter electromotive force induced into the first coil 1a by the current $i_{b2}'$ transferred from the first coil 1a to the second coil 1b, which then flowing through a closed loop defined by the second coil 1b, power source 4 and diode 8, has a magnitude about twice that of the voltage of the power source 4. As a result, a voltage about three times that of the power source 4 is impressed between the collector and emitter of the transistor 5. It is therefore preferred that the breakdown voltage of the Zener diode 15 be set at a level lower than the allowable voltage impressed between the collector and emitter of the transistor 5; and, yet that it be over three times that of the power source 4.

The foregoing example refers to the function and effect of the Zener diode 15 when the exciting current of the first coil 1a is cut off, after its excitation, and the second coil 1b is excited. However, the Zener diode 16, when the first coil 1a is excited, after cutting off the second coil 1b, obviously has the same function and effect as described above.

What is claimed is:

1. A pulse motor-driving circuit comprising:

first and second exciting coils wound about the stator of a pulse motor, and connected in series at a node between a first end of said first exciting coil and a second end of said second exciting coil, so as to be inductively coupled to each other;

a reference potential line;

a D.C. power source connected at the positive terminal to said node and at the negative terminal to said reference potential line;

a first transistor connected at the collector to said second end of said first exciting coil and at the emitter to said reference potential line and to the base electrode thereof through a first resistor, said first transistor being controlled by a first signal for selectively exciting said first exciting coil;

a second transistor connected at the collector to said first end of said second exciting coil, and at the emitter to said reference potential line and to the base electrode thereof through a second resistor, said second transistor being controlled by a second signal for selectively exciting said second exciting coil;

commutation means which inductively transfers a first exciting current of said first exciting coil to said D.C. power source, through said second exciting coil, when said first transistor is rendered nonconductive, and which also transfers a second exciting current of said second exciting coil to said D.C. power source, through said first exciting coil, when said second transistor is rendered nonconductive; and a first Zener diode whose cathode is connected to the collector of said first transistor, and whose anode is connected to the base electrode of said first transistor, and a second Zener diode whose cathode is connected to the collector of said second transistor, and whose anode is connected to the base electrode of said second transistor, each of said first and second Zener diodes being chosen so as to have a breakdown voltage over three times the voltage across said D.C. power supply source but lower than the withstand voltage between the collector and the emitter of said first and second transistors.

* * * * *